(12) United States Patent
Sakai et al.

(10) Patent No.: US 7,617,738 B2
(45) Date of Patent: Nov. 17, 2009

(54) METHOD AND APPARATUS FOR MEASURING FLOW RATE OF FLUID

(75) Inventors: Iwao Sakai, Saitama (JP); Satoshi Kushida, Saitama (JP); Noriyoshi Machida, Saitama (JP); Mitsuru Ikeda, Saitama (JP)

(73) Assignee: Avance Techne Accent Corp., Tsurugashima-shi, Saitama (JP)

( * ) Notice: Subject to any disclaimer, the term of this patent is extended or adjusted under 35 U.S.C. 154(b) by 745 days.

(21) Appl. No.: 10/529,400

(22) PCT Filed: Jun. 1, 2004

(86) PCT No.: PCT/JP2004/007525

§ 371 (c)(1),
(2), (4) Date: Mar. 28, 2005

(87) PCT Pub. No.: WO2005/119182

PCT Pub. Date: Dec. 15, 2005

(65) Prior Publication Data

US 2006/0243065 A1 Nov. 2, 2006

(51) Int. Cl.
*G01F 1/66* (2006.01)
(52) U.S. Cl. .................................. 73/861.27
(58) Field of Classification Search ....................... None
See application file for complete search history.

(56) References Cited

U.S. PATENT DOCUMENTS

| 3,981,191 | A | * | 9/1976 | Brown et al. | 73/861.28 |
| 6,907,792 | B2 | * | 6/2005 | Ohnishi | 73/861.27 |
| 2004/0050176 | A1 | * | 3/2004 | Ohnishi | 73/861.18 |

* cited by examiner

Primary Examiner—Harshad Patel
(74) Attorney, Agent, or Firm—Nixon Peabody LLP; Jeffrey L. Costellia

(57) ABSTRACT

The invention provides a method and an apparatus for measuring a flow rate which can determine a flow rate of a fluid, particularly a slowly flowing fluid, with an improved accuracy, without requiring a complicated flow rate-measuring system.

A system for measuring a flow rate of a fluid flowing within a tube is composed of an upstream side piezoelectric element and a downstream side piezoelectric element mounted on a surface of a tube and is operated by applying an impulse voltage to one piezoelectric element to generate a shock to produce a shock wave in the fluid moving in the tube; receiving the shock wave transmitted through the fluid by another piezoelectric element and then applying an impulse voltage to the latter piezoelectric element to generate a shock to produce a shock wave in the fluid in the tube and receiving the shock wave transmitted through the fluid by the former piezoelectric element; and comparing the received waves to determine the flow rate of the fluid, in which the flow rate of the moving fluid is determined by processing the received waves based on a newly discovered phenomenon in that there is a relationship between a flow rate of fluid and a wave height or an integral value of a composite wave; otherwise the flow rate of a moving fluid under measurement can be determined according to a difference of periods of time required for transmitting the shock waves.

18 Claims, 14 Drawing Sheets

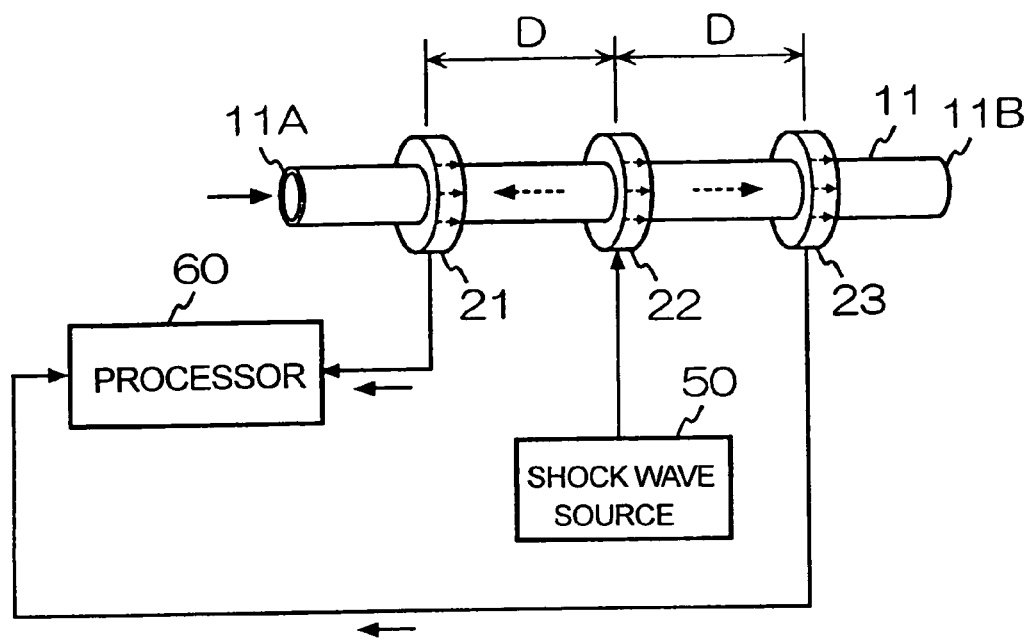
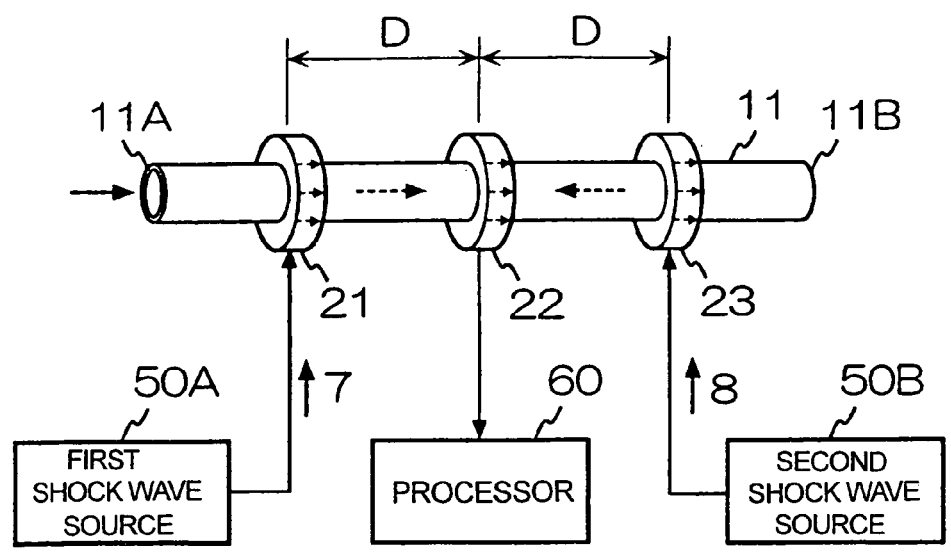

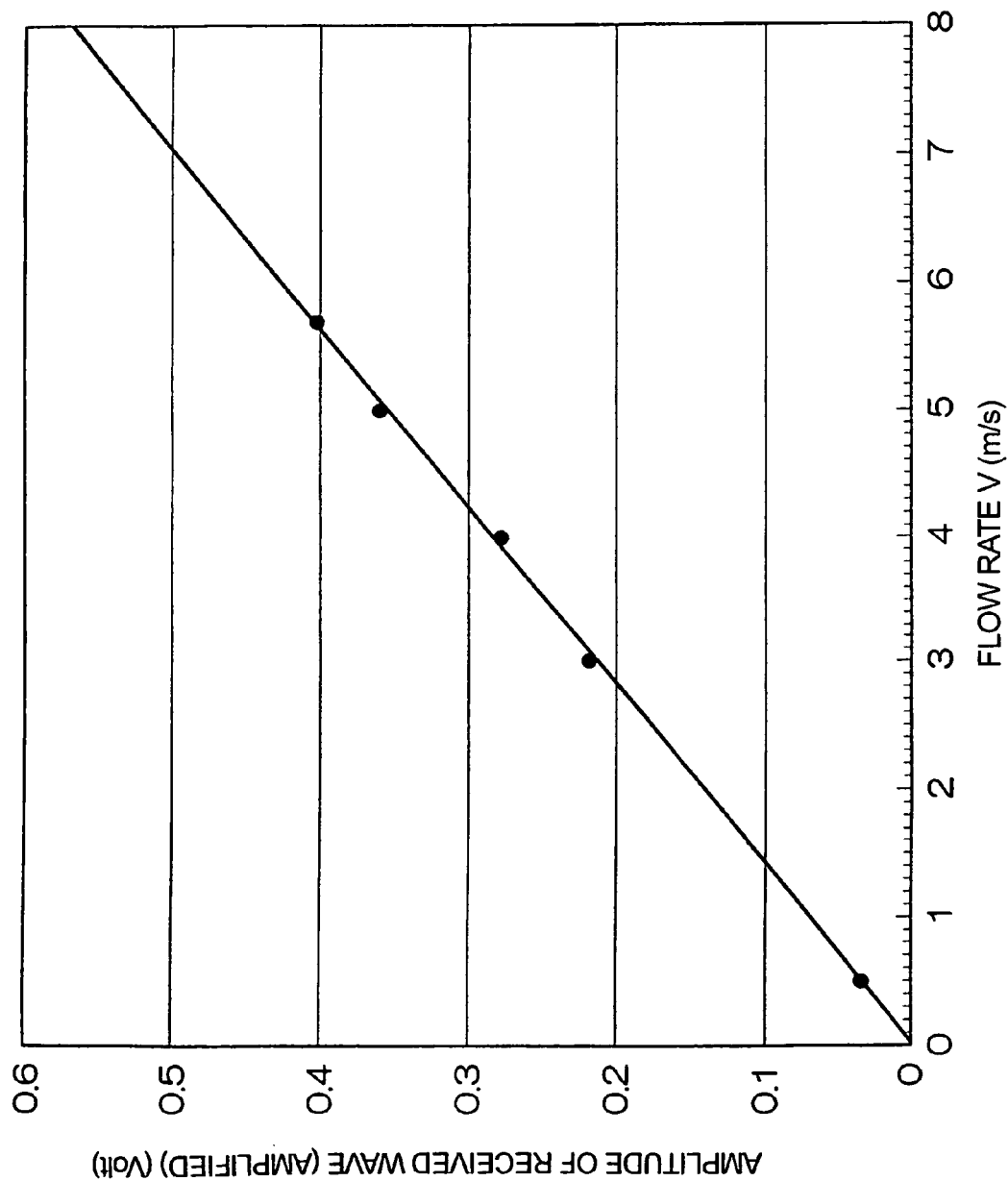

METHOD AND APPARATUS FOR MEASURING FLOW RATE OF FLUID

FIELD OF THE INVENTION

The present invention relates to a method for measuring a flow rate of a liquid and an apparatus therefor.

BACKGROUND OF THE INVENTION

It has been known that a flow rate of a fluid flowing in a tube can be measured utilizing ultrasonic wave. A representative method utilizes a variation of a period of time required for transmission of the ultrasonic wave in the flowing fluid according to the Doppler effect. The method for measuring the flow rate comprises the steps of: preparing a flow rate-measuring system in which two or more ultrasonic transducers are arranged on a tube along a tube axis; applying a sine wave alternating energy to one ultrasonic transducer so as to generate a ultrasonic wave; transmitting the ultrasonic wave through a fluid flowing within the tube; receiving the transmitted ultrasonic wave by another ultrasonic transducer; recording the period of time required for the transmission; applying a sine wave alternating energy to the latter ultrasonic transducer so as to generate a ultrasonic wave; transmitting the ultrasonic wave through the flowing fluid in the opposite direction; receiving the transmitted ultrasonic wave by the former ultrasonic transducer; recording the period of time required for the transmission; and comparing the difference between the two transmission periods with a relationship (calibration curve) between the flow rate and the difference of transmission period which has been separately prepared using a flow rate-measuring system having the same structure and the same fluid, to determine the flow rate of the flowing fluid.

Japanese Patent Provisional Publication 10-122923 describes a flow meter utilizing a system which comprises the steps of: preparing two ultrasonic transducers mounted onto an outer surface of a tube along the tube axis; applying an alternating electric energy to one transducer to generate a ultrasonic wave; transmitting the ultrasonic wave through a fluid flowing in the tube; receiving the transmitted ultrasonic wave by another transducer; alternating the generation and receipt of the ultrasonic wave between the former transducer and the latter transducer to measure a period of time for transmission of ultrasonic wave from the upstream side to the downstream side and a period of time transmission of the ultrasonic wave from the downstream side to the upstream side; and processing the difference between the measured periods of time to determine the flow rate of the fluid flowing in the tube.

Japanese Patent Provisional Publication 10-9914 describes a flow meter utilizing a system which comprises the steps of: preparing three ultrasonic transducers mounted onto an outer surface of a tube along the tube axis; applying an alternating electric energy to the central transducer to generate a ultrasonic wave; transmitting the ultrasonic wave through a fluid flowing in the tube; receiving the transmitted ultrasonic wave by the other transducers; measuring a period of time of transmission of ultrasonic wave from the upstream side to the downstream side and a period of time transmission of the ultrasonic wave from the downstream side to the up-stream side; and processing the difference between the measured periods of time to determine the flow rate of the fluid flowing in the tube.

PROBLEMS TO BE SOLVED BY THE INVENTION

The above-mentioned known flow rate-determining system utilizing a procedure which comprises applying a sine wave alternating electric energy to a piezoelectric element to generate a ultrasonic wave; transmitting the ultrasonic wave from the upstream side to the downstream side and from the downstream side to the upstream side: and detecting the difference of the transmission period of time according to the Doppler effect is an established flow rate-determining system. However, this flow rate-determining system gives not always an accurate flow rate because the wave form of the ultrasonic wave transmitted through the flowing fluid is so complicated that it is not easy to determine an appropriate target point for the use of measuring the transmission period. If the determined target point is inappropriate, the accuracy of the determined flow rate is low. Particularly, in the case that the fluid flows slowly, the transmission period of time is short. Therefore, these two problems in combination cause decrease of the accuracy of the flow rate of the slowly flowing fluid.

The present invention has an object to provide a flow rate-measuring method and a flow rate-measuring apparatus which give an accurate flow rate, particularly, a flow rate of a fluid flowing slowly, without requiring a complicated flow rate-measuring system.

DISCLOSURE OF THE INVENTION

The present inventors have made studies on a relationship between an electric energy applied to one piezoelectric ultrasonic transducer of the conventional flow meter and a wave form of a ultrasonic wave received by another piezoelectric ultrasonic transducer which is transmitted through a flowing fluid after generation in the former ultrasonic transducer. As a result, they have discovered that if the sine wave alternating energy employed in the conventional system for applying the energy to the piezoelectric element is replaced with a shock energy caused by application of an impulse voltage having steep rising edge or steep falling edge, a shock wave received by a wave-receiving piezoelectric element after generation and transmission in a flowing fluid gives a simpler wave form and hence the determination of the target point for the measurement of transmission period is facilitated. This phenomenon has not been known until now.

As a result of further study, the inventors have discovered that if the impulse voltage with steep rising edge or steep falling edge is employed as the energy to be applied to the shock wave-generating piezoelectric element, the generated shock wave received after transmission from the upstream side to the downstream side and the generated shock wave received after transmission from the downstream side to the upstream side show the same wave form, and an amplitude and a integral value of a composite wave prepared by processing (such as addition processing or subtraction processing) of the wave form of the received shock wave shows a highly proportional relationship with a flow rate of the flowing fluid. This phenomenon also has not been known yet.

The present invention is completed based on the above-mentioned new discoveries.

Accordingly, from the first aspect, the present invention resides in a method for measuring a flow rate of a fluid moving in a tube which comprises the steps of:

(1) preparing a flowmeter comprising a set of a first upstream side shock wave-generating piezoelectric element and a first downstream side shock wave-receiving piezoelectric element and a set of a second downstream side shock wave-generating piezoelectric element and a second upstream side shock wave-receiving piezoelectric element arranged on a surface of the tube under such condition that the shock wave-generating piezoelectric element and the shock wave-receiving piezoelectric element of each set are arranged along a fluid-moving direction apart from each other at an equivalent distance;

(2) causing movement of the fluid in the tube and, while the fluid is moving, an impulse voltage with steep rising edge or steep falling edge is applied to the first shock wave-generating piezoelectric element to generate a shock and transmit the shock through a wall of the tube into the moving fluid so as to produce a shock wave in the moving fluid;

(3) transmitting the shock wave through the moving fluid and receiving the transmitted shock wave by the first shock wave-receiving piezoelectric element through the wall of the tube;

(4) while the fluid is moving, an impulse voltage with steep rising edge or steep falling edge is applied to the second shock wave-generating piezoelectric element to generate a shock and transmit the shock through the wall of the tube into the moving fluid so as to produce a shock wave in the moving fluid;

(5) transmitting the shock wave generated in the step (4) through the moving fluid and receiving the transmitted shock wave by the second shock wave-receiving piezoelectric element through the wall of the tube;

(6) processing data of the wave received in the step (3) and data of the wave received in the step (5) to obtain data of a composite wave and detecting a predetermined characteristic value from the data of the composite wave;

(7) preparing a relationship between a moving rate of the fluid and the same characteristic value of data of a composite wave corresponding to the moving rate separately; and (8) comparing the characteristic value of data of the composite wave obtained in the step (6) with the relationship obtained in the step (7), to calculate the flow rate of the fluid of the step (2).

In the above-mentioned flow rate-measuring method, the generation and receipt of shock wave in the steps (2) and (3) and the series of procedures for processing the received wave to convert into data, and the generation and receipt of shock wave in the steps (4) and (5) and the series of procedures for processing the received wave to convert into data can be simultaneously if the apparatus employed can afford such procedures. Further, these procedures can be performed in an adverse order, for instance, the steps (2) and (3) can be performed after the steps (4) and (5).

The procedure of the step (7) is a step for preparing or obtaining a calibration curve. This procedure can be performed employing the same flow meter or a flow meter having the same constitution and the same fluid and preparing a relationship (in the form of a formula) between the flow rate and the characteristic value obtained from the composite wave which is produced by processing the data of waves received by shock wave-receiving piezoelectric elements after transmission of the generated shock wave through the flowing (moving) fluid. The step (7) can be performed any time before the step (8).

In the above-mentioned flow rate-measuring method, the procedure of processing for obtaining the data of the composite wave in the step (6) is preferably performed by obtaining a difference between the data of the wave received in the step (3) and the data of the wave received in the step (5).

In the above-mentioned flow rate-measuring method, the characteristic value to be detected in the steps (6) and (7) preferably is the following characteristic value:

(a) a height of a wave appearing in a predetermined position in the composite wave;

(b) a height of a highest wave appearing in the composite wave;

(c) an integral value of an absolute value of the composite wave;

(d) an integral value of absolute values of wave components appearing in a period predetermined within a period from a first wave component to a tenth wave component of the composite wave; or (e) an integral value of an absolute value of a highest wave appearing in the composite wave.

The invention also resides in an apparatus favorably employable for performing the flow rate-measuring method of the above-mentioned invention which comprises a set of a first upstream side shock wave-generating piezoelectric element and a first downstream side shock wave-receiving piezoelectric element and a set of a second downstream side shock wave-generating piezoelectric element and a second upstream side shock wave-receiving piezoelectric element arranged on a surface of a tube under such condition that the shock wave-generating piezoelectric element and the shock wave-receiving piezoelectric element of each set are arranged along a fluid-moving direction apart from each other at an equivalent distance; an electric voltage source connected to each of the shock wave-generating piezoelectric elements directly or via switching means, whereby applying an impulse voltage with steep rising edge or steep falling edge to each of the shock wave-generating piezoelectric elements; and processing means connected to each of the shock wave-receiving piezoelectric elements directly or via switching means, whereby detecting waves received by the shock wave-receiving piezoelectric elements, preparing a composite wave from the detected waves, and detecting a predetermined characteristic value from the composite wave.

From the second aspect, the invention resides in a method for measuring a flow rate of a fluid moving in a tube which comprises the steps of:

(1) preparing a flowmeter comprising a set of a first upstream side shock wave-generating piezoelectric element and a first downstream side shock wave-receiving piezoelectric element and a set of a second downstream side shock wave-generating piezoelectric element and a second upstream side shock wave-receiving piezoelectric element arranged on a surface of the tube under such condition that the shock wave-generating piezoelectric element and the shock wave-receiving piezoelectric element of each set are arranged along a fluid-moving direction apart from each other at an equivalent distance;

(2) causing movement of the fluid in the tube and, while the fluid is moving, an impulse voltage with steep rising edge or steep falling edge is applied to the first shock wave-generating piezoelectric element to generate a shock and transmit the shock through a wall of the tube into the moving fluid so as to produce a shock wave in the moving fluid;

(3) transmitting the shock wave through the moving fluid and receiving the transmitted shock wave by the first shock wave-receiving piezoelectric element through the wall of the tube to measure a period of time required for the transmission of the shock wave from the first shock wave-generating piezoelectric element to the first shock wave-receiving piezoelectric element;

(4) while the fluid is moving, an impulse voltage with steep rising edge or steep falling edge is applied to the second shock wave-generating piezoelectric element to generate a shock and transmit the shock through the wall of the tube into the moving fluid so as to produce a shock wave in the moving fluid;

(5) transmitting the shock wave generated in the step (4) through the moving fluid and receiving the transmitted shock wave by the second shock wave-receiving piezoelectric element through the wall of the tube to measure a period of time required for the transmission of the shock wave from the second shock wave-generating piezoelectric element to the second shock wave-receiving piezoelectric element;

(6) obtaining a difference of the period of time measured in the steps (3) and (5) required for the transmission of the shock wave;

(7) preparing a relationship between a moving rate of the fluid and a difference of period of time required for transmission of shock wave from the shock wave-generating piezoelectric element to the shock wave-receiving piezoelectric element separately; and (8) comparing the period of time required for the transmission of shock wave obtained in the step (6) with the relationship obtained in the step (7), to calculate the flow rate of the fluid of the step (2).

In the above-mentioned flow rate-measuring method, the generation and receipt of shock wave in the steps (2) and (3) and the series of procedures for processing the received wave to convert into data, and the generation and receipt of shock wave in the steps (4) and (5) and the series of procedures for processing the received wave to convert into data also can be simultaneously if the apparatus employed can afford such procedures. Further, these procedures can be performed in an adverse order, for instance, the steps (2) and (3) can be performed after the steps (4) and (5).

The procedure of the step (7) is a step for preparing or obtaining a calibration curve. The step (7) can be performed any time before the step (8).

The invention also resides in an apparatus favorably employable for performing the flow rate-measuring method of the second invention which comprises a set of a first upstream side shock wave-generating piezoelectric element and a first downstream side shock wave-receiving piezoelectric element and a set of a second downstream side shock wave-generating piezoelectric element and a second upstream side shock wave-receiving piezoelectric element arranged on a surface of a tube under such condition that the shock wave-generating piezoelectric element and the shock wave-receiving piezoelectric element of each set are arranged along a fluid-moving direction apart from each other at an equivalent distance; and an electric voltage source connected to each of the shock wave-generating piezoelectric elements directly or via switching means, whereby applying an impulse voltage with steep rising edge or steep falling edge to each of the shock wave-generating piezoelectric elements.

The impulse voltage employed in the invention is applied preferably under such condition that the voltage is kept constant until the generation of the shock in the shock wave-generating piezoelectric element ceases, more preferably until the wave to be processed afterward (for instance, a wave appearing in a predetermined position, or a wave appearing within a period from a first wave component to a tenth wave component of the composite wave) is generated; most preferably until the shock wave-receiving piezoelectric element receives the shock wave after the generation of shock wave in the shock wave-generating piezoelectric element.

The shock wave-generating piezoelectric element and shock wave-receiving piezoelectric element employed in the invention generally have the same acoustic characteristics. One shock wave-generating piezoelectric element can be used to serve as the first shock wave-generating piezoelectric element as well as the second shock wave-generating piezoelectric element. One shock wave-receiving piezoelectric element can be used to serve as the first shock wave-receiving piezoelectric element as well as the second shock wave-receiving piezoelectric element.

In more detail, the following embodiments can be adopted:

(a) the first upstream side shock wave-generating piezoelectric element serves as the second upstream side shock wave-receiving piezoelectric element and the first downstream side shock wave-receiving piezoelectric element serves as the second downstream side shock wave-generating piezoelectric element;

(b) the first downstream side shock wave-receiving piezoelectric element serves as the second upstream side shock wave-receiving piezoelectric element; and (c) the first downstream side shock wave-generating piezoelectric element serves as the second upstream side shock wave-generating piezoelectric element.

EFFECTS OF THE INVENTION

The flow rate-measuring method utilizing transmission of the shock wave according to the invention makes it possible to determine a flow rate, particularly a flow rate of a slowly flowing fluid at increased accuracy without requiring a flow rate-measuring apparatus having a complicated constitution.

PREFERRED EMBODIMENTS OF THE INVENTION

The present invention will be further described by referring to the attached drawings.

FIG. 1 illustrates a flow rate-measuring apparatus that is favorably employable for performing the flow rate-measuring method utilizing the shock wave according to the invention.

The flow rate-measuring apparatus comprises a tube 11 and a flow meter having a upstream side piezoelectric element 12 and a downstream side piezoelectric element 13 which are mounted onto a surface of the tube along the direction of movement of a fluid within the tube (which flows from 11A to 11B). To the piezoelectric elements 12, 13 are connected an impulse voltage source 50 and a processor 60 via a switch (switching means) 4. The impulse voltage source 50 can produce an impulse voltage having steep rising edge or steep falling edge (hereinafter which may be simply referred to as "impulse voltage"). In the processor 60, the wave received by each of the piezoelectric elements 12, 13 is detected, both of the transmission period of shock wave from the piezoelectric element 12 to the piezoelectric element 13 and the transmission period of shock wave from the piezoelectric element 13 to the piezoelectric element 12 are recorded, and the recorded periods are compared to calculate the difference of period. Alternatively, the received waves are recorded, a composite wave is prepared from the received waves, and a predetermined characteristic value is detected from the composite wave. Otherwise, the comparison of the transmission periods and the detection of the predetermined characteristic value from the composite wave are both performed.

The method for measuring the flow rate utilizing the apparatus of FIG. 1 is further described.

The impulse voltage source 50 applies an impulse voltage 7 to the piezoelectric element 12 through one switch 4 so as to generate a shock in the piezoelectric element 12. The shock is then transmitted to a fluid in the tube 11 through a wall of the tube to produce a shock wave in the fluid. The shock wave is transmitted through the fluid and subsequently received by the piezoelectric element 13 after transmitted through the wall of the tube. The wave received by the piezoelectric element 13 is transmitted through another switch 4 and recorded in the processor 60. Subsequently, the connecting circuit for the switches is switched, and the impulse voltage source 50 applies the same impulse voltage 7 to the piezoelectric element 13 through the latter switch 4 so as to generate a shock in the piezoelectric element 13. The shock is then transmitted to a fluid in the tube 11 through the wall of the tube to produce a shock wave in the fluid. The shock wave is transmitted through the fluid and subsequently received by the piezoelectric element 12 after transmitted through the wall of the tube. The wave received by the piezoelectric element 12 is transmitted through the former switch 4 and recorded in the processor 60. Each of the waves recorded in the processor 60 is then processed according to a predetermined program.

The flow rate-measuring method of the invention which utilizes shock wave also can be performed by means of a flow rate-measuring apparatus illustrated in FIG. 2. In the flow rate-measuring apparatus of FIG. 2, one shock wave-generating piezoelectric element 22 is mounted onto the tube 11, and each of a pair of shock wave-receiving piezoelectric elements 21, 23 is placed at a position apart from the shock wave-generating piezoelectric element by a distance D. The impulse voltage source 50 applies an impulse voltage to the shock wave-generating piezoelectric element 22. In the shock wave-generating piezoelectric element 22, a shock is produced and transmitted into the fluid to generate a shock wave. The shock wave is then transmitted toward the upstream side (toward the tube end 11A) as well as the downstream side (toward the tube end 11B). The transmitted shock waves are received by the shock wave-receiving piezoelectric elements 21, 23, and the received shock waves are then processed in the processor 60.

The flow rate-measuring method of the invention which utilizes shock wave also can be performed by means of a flow rate-measuring apparatus illustrated in FIG. 3. In the flow rate-measuring apparatus of FIG. 3, one shock wave-receiving piezoelectric element 22 is mounted onto the tube 11, and each of a pair of shock wave-generating piezoelectric elements 21, 23 is placed at a position apart from the shock wave-receiving piezoelectric element 22 by a distance D. A first impulse voltage source 50A applies an impulse voltage 7 to the shock wave-generating piezoelectric element 21, while a second impulse voltage source 50B applies an impulse voltage 8 to the shock wave-generating piezoelectric element 23. In each of the shock wave-generating piezoelectric elements 21, 23, a shock is produced and transmitted into the fluid to generate a shock wave. The shock waves are then transmitted through the fluid and received by the shock wave-receiving piezoelectric element 22, and the received shock waves are then processed in the processor 60. In the flow rate-measuring apparatus of FIG. 3, the impulse voltage 7 given by the first impulse voltage source 50A and the impulse voltage 8 given by the second impulse voltage B have a phase opposite to each other. For instance, the first impulse voltage source 50A gives a steeply falling impulse voltage, while the second impulse voltage source 50B gives a steeply rising impulse voltage. Under these conditions, the shock waves received by the shock wave-receiving piezoelectric element 22 have phases opposite to each other so that the composite wave can be prepared from the both received shock waves by addition operation.

The flow rate-measuring method of the invention which utilizes shock wave also can be performed by means of a flow rate-measuring apparatus illustrated in FIG. 4. The flow rate-measuring apparatus of FIG. 4 is the same as the flow rate-measuring apparatus of FIG. 33 except that one impulse voltage source 50 is commonly used and that the polarizing direction of the piezoelectric element 23 is set opposite to the polarizing direction of the piezoelectric element 22. In the apparatus of this constitution, the processing in the processor 60 can be performed by addition operation.

In FIGS. 1 to 4, the piezoelectric elements 12, 14, 21, 22 and 23 are piezoelectric ring elements. It should be noted, however, that the piezoelectric elements can be in the form of a portion of ring 20, as is illustrated in FIG. 5.

EXAMPLES

The flow rate-measuring apparatus of FIG. 1 was manufactured using a PFA tube (perfluoroalkylene tube) 11 (length: 200 mm, inner diameter 2 mm, outer diameter 4 mm) and barium titanate piezoelectric elements (outer diameter 7 mm, inner diameter 4 mm, width 2 mm) 12, 13. The barium titanate piezoelectric element 12 and the barium titanate piezoelectric element 13 had the same acoustic characteristics, and the distance (D) between the piezoelectric element 12 and the piezoelectric element 13 was set to 40 mm.

In the tube 11 of the above-mentioned flow rate-measuring apparatus, water at 25° C. was filled. While the water was kept still, an impulse voltage 7 steeply falling from 10 V to −10 V was applied to the piezoelectric element 12. The shock wave generated in the fluid was transmitted to and received by the piezoelectric element 13. The received shock wave 9 (amplified) is illustrated in FIG. 6. In FIG. 6, t0 indicates a period of time from the time of application of the impulse voltage to the time at which the transmitted shock wave reaches the piezoelectric element 13. The initial point of the received wave is indicated by tBEGIN9. The received wave 9 (amplified) is in the form of a sine wave having a clear initial point from the wave component of the first period to the wave component of the tenth period. t0 is 33 μsec, which corresponds to total of 5 μsec (period of time required for passing through the wall (2 mm in total) of the tube, calculated using 700 m/sec for the ultrasonic transmission rate in PFA) and 28 μsec (period of time required for transmission through water, calculated using 1,500 m/sec for the ultrasonic transmission rate in water).

Subsequently, while the water in the tube 11 was kept still, an impulse voltage 7 steeply falling from 10 V to −10 V was applied to the piezoelectric element 13. The shock wave generated in the fluid was transmitted to and received by the piezoelectric element 12. The received shock wave 10 (amplified) is illustrated in FIG. 7. In FIG. 7, to indicates a period of time from the time of application of the impulse voltage to the time at which the transmitted shock wave reaches the piezoelectric element 12. The initial point of the received wave is indicated by tBEGIN10. The received wave 10 (amplified) is in the form of a sine wave having a clear initial point from the wave component of the first period to the wave component of the tenth period. Since the water in the tube 11 has the same temperature and is kept still, t0 is 33 μsec.

In order to obtain the difference between the received wave 9 (amplified) of FIG. 6 and the received wave 10 (amplified) of FIG. 7, a received wave (−)10 (amplified) is prepared by multiplying the received wave 10 (amplified) of FIG. 7 by (−1). Thus prepared received wave (−)10 is placed in FIG. 6 in the form of a broken line to give FIG. 8. In FIG. 8, D(0) is a composite wave prepared by adding the received wave 9 (amplified) to the received wave (−)10 (amplified). The composite wave D(0) indicates the difference of the received waves (amplified).

The wave components of from the first period to the tenth period all of which have a clear sine wave are enlarged in the time axis (axis of abscissa) for both the received wave 9 (amplified) and the received wave (−)10 (amplified) in FIG. 8. The enlarged wave components are illustrated in FIG. 9. D(0) which means the difference wave of the received waves (amplified) is also placed. It is apparent that the waveform of D(0) is almost the same as the reference line (level 0) in any periods of the received wave. In other words, the received wave 9 (amplified) are substantially the same as the received wave 10 (amplified).

Subsequently, water (25° C.) was caused to flow in the tube 11 from 11A to 11B at a flow rate of 3 m/sec (V=3 m/sec), and an impulse voltage 7 steeply falling from 10 V to −10 V was applied to the piezoelectric element 12, and a shock wave generated in the fluid was transmitted to the piezoelectric element 13. The wave received by the piezoelectric element 13 is amplified and given in FIG. 10 under the indication of 9-1. In FIG. 10, tF-1 (=t0−Δt1) indicates a period of time from the application of the impulse voltage to the time at which the shock wave reaches the piezoelectric element 13. The initial point of the received wave is indicated by tBEGIN9-1. In the received wave 9-1 (amplified), the wave form from the first wave component to the 10th wave component is in the form of a sine wave having a clear initial point. Δt1 is approximately 50 nsec.

Then, while water was kept flowing in the tube 11 at the same flow rate (V=3 m/sec), an impulse voltage 7 steeply falling from 10 V to −10 V was applied to the piezoelectric element 13, and a shock wave generated in the fluid was transmitted to the piezoelectric element 12. The wave received by the piezoelectric element 12 is amplified and given in FIG. 11 under the indication of 10-1. In FIG. 11, tB-1 (=t0+Δt1) indicates a period of time from the application of the impulse voltage to the time at which the shock wave reaches the piezoelectric element 12. The initial point of the received wave is indicated by tBEGIN10-1. In the received wave 10-1 (amplified), the wave form from the first wave component to the tenth wave component is in the form of a sine wave having a clear initial point. Δt1 also is approximately 50 nsec.

In order to obtain the difference between the received wave 9-1 (amplified) of FIG. 10 and the received wave 10-1 (amplified) of FIG. 11, a received wave (−)10-1 (amplified) is prepared by multiplying the received wave 10-1 (amplified) of FIG. 11 by (−1). Thus prepared received wave (−)10-1 is placed in FIG. 10 in the form of a broken line to give FIG. 12. In FIG. 12, D(1) is a composite wave prepared by adding the received wave 9-1 (amplified) to the received wave (−)10-1 (amplified). The composite wave D(1) indicates the difference of the received waves (amplified).

The wave components of from the first period to the tenth period all of which have a clear sine wave are enlarged in the time axis (axis of abscissa) for both of the received wave 9-1 (amplified) and the received wave (−)10-1 (amplified) in FIG. 12. The enlarged wave components are illustrated in FIG. 13. D(1) which means the difference wave of the received waves (amplified) is also placed. It is apparent that the waveform of D(1) is a sine wave almost symmetrical about the reference line in any periods of the received wave.

Subsequently, water (25° C.) was caused to flow in the tube 11 from 11A to 11B at a flow rate of 5.7 m/sec (V=5.7 m/sec), and an impulse voltage 7 steeply falling from 10 V to −10 V was applied to the piezoelectric element 12, and a shock wave generated in the fluid was transmitted to the piezoelectric element 13. The wave received by the piezoelectric element 13 is amplified and given in FIG. 14 under the indication of 9-2. In FIG. 14, tF-2 (=t0−Δt2) indicates a period of time from the application of the impulse voltage to the time at which the shock wave reaches the piezoelectric element 13. The initial point of the received wave is indicated by tBEGIN9-2. In the received wave 9-2 (amplified), the wave form from the first wave component to the tenth wave component is in the form of a sine wave having a clear initial point.

Then, while water was kept flowing in the tube 11 at the same flow rate (V=5.7 m/sec), an impulse voltage 7 steeply falling from 10 V to −10 V was applied to the piezoelectric element 13, and a shock wave generated in the fluid was transmitted to the piezoelectric element 12. The wave received by the piezoelectric element 12 is amplified to give the wave 10-2 which is then multiplied by (−1) to give a received wave (−)10-2 (amplified). The received wave (−)10-2 (amplified) is given in FIG. 14. In FIG. 14, tB-2 (=t0+Δt2) indicates a period of time from the application of the impulse voltage to the time at which the shock wave reaches the piezoelectric element 12. The initial point of the received wave is indicated by tBEGIN10-2. D(2) is a composite wave prepared by adding the received wave 9-2 (amplified) to the received wave (−)10-2 (amplified).

In each of the received wave 9-2 (amplified) and received wave (−)10-2 (amplified) in FIG. 14, the wave components of from the first period to the tenth period all of which have a clear sine wave are enlarged in the time axis (axis of abscissa). The enlarged wave components are illustrated in FIG. 15. D(2) which means the difference wave of the received waves (amplified) is also placed. It is apparent that the waveform of D(2) is a sine wave almost symmetrical about the reference line in any periods of the received wave.

The above-mentioned procedures were repeated except that the flowing rate of water (25° C.) was changed to 0.5 m/sec (V=0.5 m/sec), 4 m/sec (V=4 m/sec), and 5 m/sec (V=5 m/sec), to give composite waves corresponding to the difference between the received waves (amplified) of FIG. 13 and FIG. 14 and the wave received in these measurements (amplified).

The amplitude (WA) of the wave component having the highest wave component in the composite wave indicating the difference of the received wave (amplified) obtained in the measurement performed under the condition that water was caused to flow in the tube 11 at a flow rate of 0.5 m/sec (V=0.5 m/sec), 3 m/sec (V=3 m/sec), 4 m/sec (V=4 m/sec), 5 m/sec (V=5 m/sec) or 5.7 m/sec (V=5.7 m/sec) and a ratio of the flow rate (V) to the amplitude (WA), that is K=V/WA, is set forth in the following Table 1.

TABLE 1

| Flow rate (V) (m/sec) | WA (amplitude of differential composite wave) | K = V/WA |
|---|---|---|
| 0.5 | 0.0343 | 14.58 |
| 3 | 0.2197 | 13.65 |
| 4 | 0.2793 | 14.32 |
| 5 | 0.3603 | 13.88 |
| 5.7 | 0.4017 | 14.19 |

The relationships between the flow rate (V) and the amplitude (WA) shown in Table 1 are plotted to give a relationship having a high primary proportion as illustrated in FIG. 16. Therefore, when a relationship between the flow rate (V) and the amplitude (WA) of the composite wave representing the difference (in a tube having the same structure, the relationship between the flow rate and the amplitude is the same) is obtained, the flow rate of the fluid under measurement can be easily determined with high accuracy by detecting the amplitude (WA) of the wave component having the highest wave height from the composite wave.

The relationship between the composite wave and the flow rate can be also obtained utilizing an integral value of an absolute value of a composite wave indicating difference. The following Table 2 shows a relationship between an integral value (S) of an absolute values of wave components from the first period to the tenth period in the differential composite wave of the received waves (amplified) obtained in the measurement performed under the condition that water was caused to flow in the tube 11 at a flow rate of 0.5 m/sec (V=0.5 m/sec), 3 m/sec (V=3 m/sec), 4 m/sec (V=4 m/sec), 5 m/sec (V=5 m/sec), or 5.7 m/sec (V=5.7 m/sec) and a ratio of the flow rate (V) to the integral value (S).

TABLE 2

| Flow rate (V) (m/sec) | S (integral value of differential composite wave) | K = V/S |
|---|---|---|
| 0.5 | 11.35 | 0.044 |
| 3 | 84.86 | 0.035 |
| 4 | 106.61 | 0.038 |
| 5 | 136.23 | 0.037 |
| 5.7 | 148.67 | 0.038 |

It is apparent that the if the relationship between the flow rate (V) and the integral value (S) of absolute values set forth in Table 2 is plotted, it should have a primarily proportional relationship having more accuracy than the primarily proportional relationship illustrated in FIG. 16.

In other words, if the proportional relationship between the flow rate (V) and the integral value (S) of absolute values of the composite wave (in a tube having the same structure, the relationship between the flow rate and the integral value of absolute values of the composite wave is the same) is determined, the flow rate of the fluid under measurement can be easily determined with high accuracy by obtaining the integral value of absolute values of the differential composite wave.

BRIEF DESCRIPTION OF DRAWINGS

FIG. 2 illustrates another flow rate-measuring apparatus that is also favorably employable for performing the flow rate-measuring method utilizing shock wave according to the invention.

FIG. 3 illustrates still another flow rate-measuring apparatus that is also favorably employable for performing the flow rate-measuring method utilizing shock wave according to the invention.

FIG. 16 is a graph showing a relationship between a flow rate (V) of a fluid moving in a tube and an amplitude (WA) of a wave component having the highest wave height in the differential composite wave.

EXPLANATION OF NUMERALS

Figure 1:
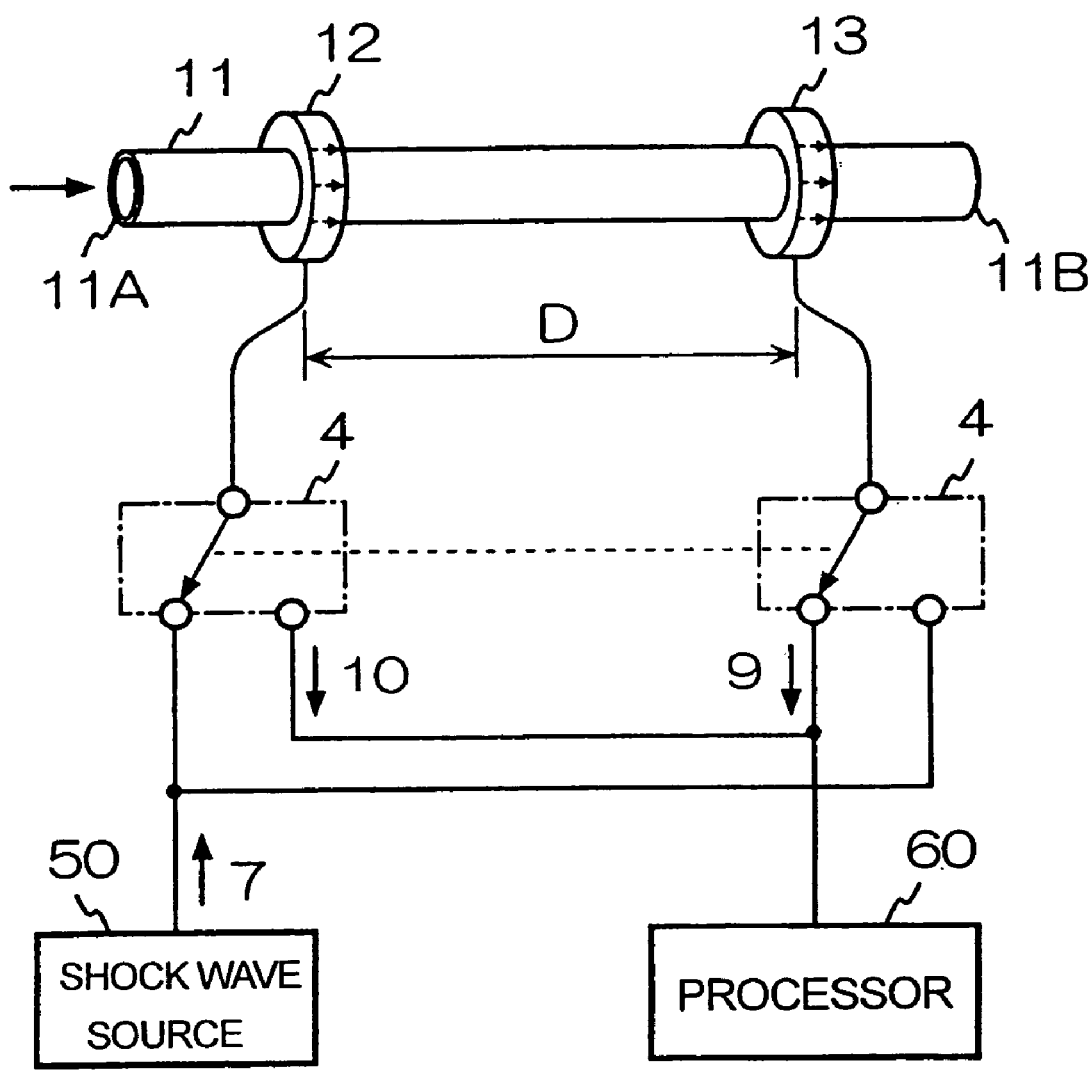
FIG. 1 illustrates a flow rate-measuring apparatus that is favorably employable for performing the flow rate-measuring method utilizing shock wave according to the invention.
Figure 4:
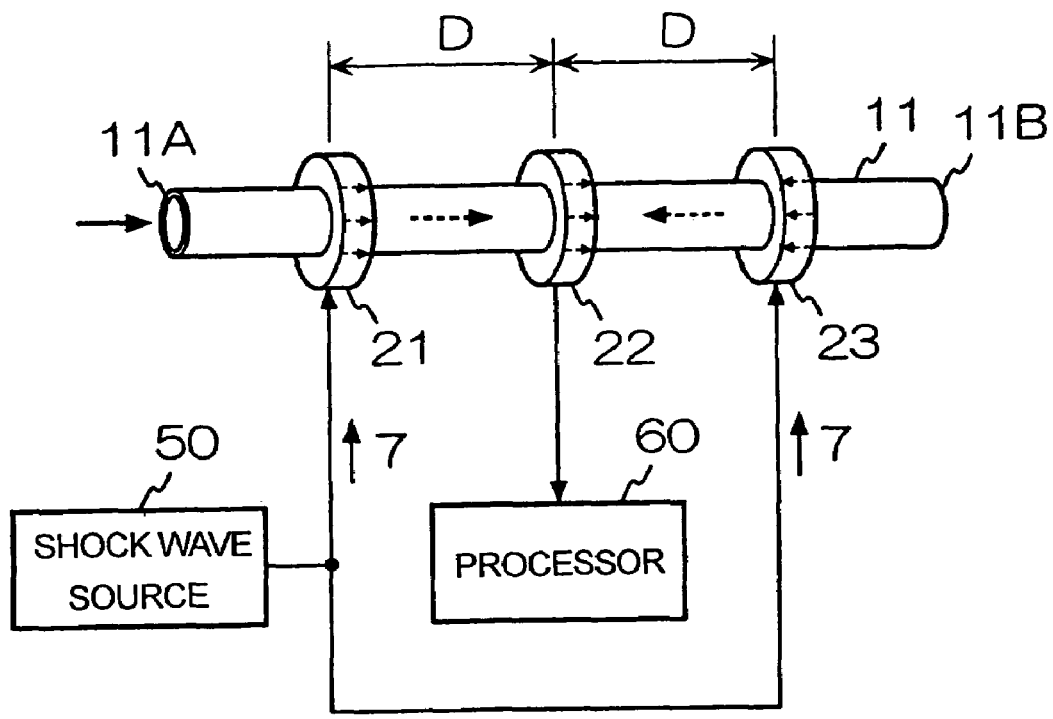
FIG. 4 illustrates still another flow rate-measuring apparatus that is also favorably employable for performing the flow rate-measuring method utilizing shock wave according to the invention.
Figure 5:
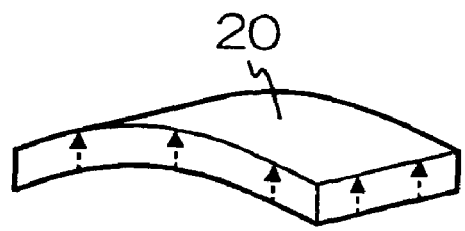
FIG. 5 schematically illustrates a transducer in the form of a portion of ring which is employable as a component of a flow rate-measuring apparatus for performing the flow rate-measuring method utilizing shock wave according to the invention.
Figure 6:
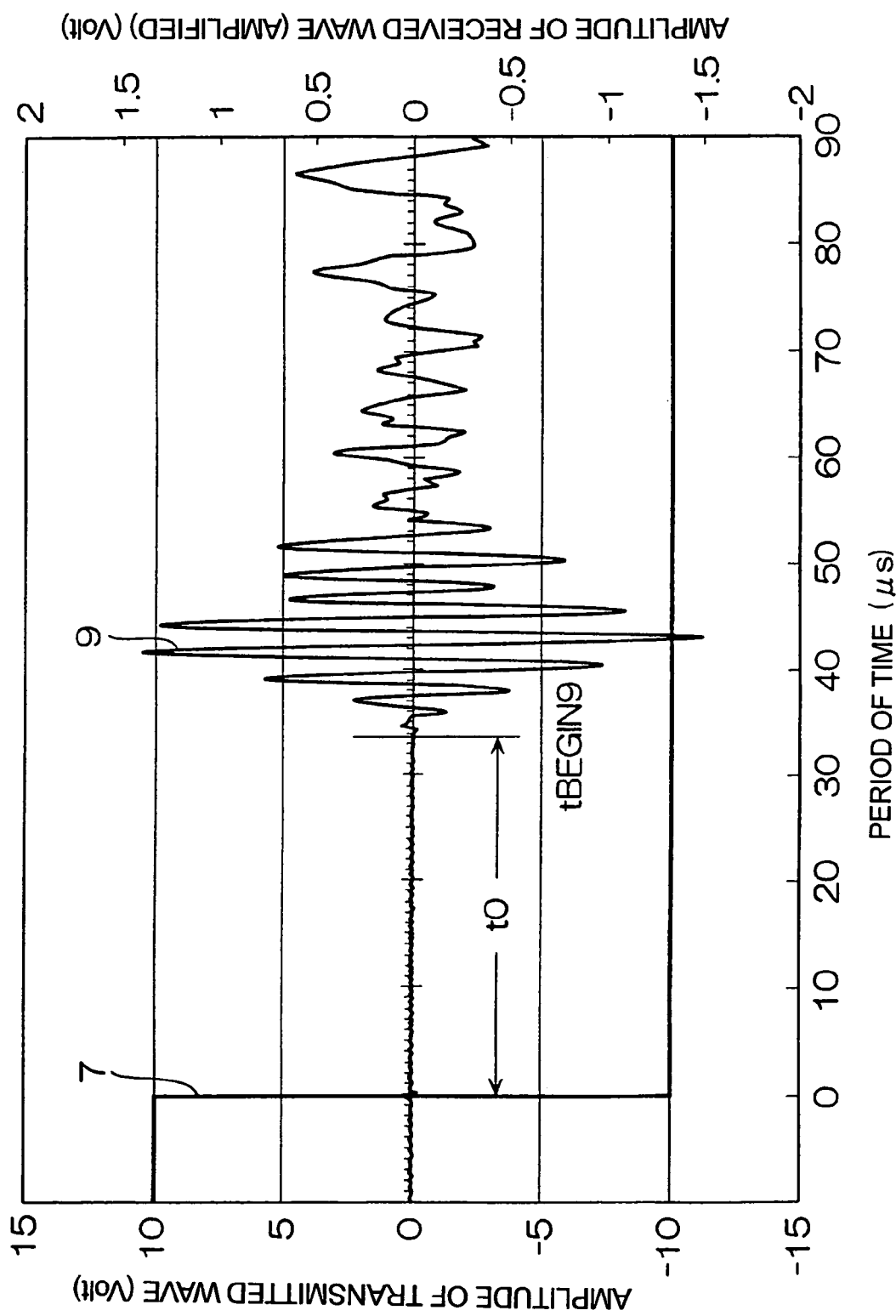
FIG. 6 illustrates a received wave (amplified) which is obtained by the steps of filling water (25° C.) in a tube 11 of the flow rate-measuring apparatus of FIG. 1, applying an impulse wave 7 steeply falling from 10 V to −10 V to the piezoelectric element 12 while the filled water is kept still, transmitting the shock wave generated in the water, and receiving the transmitted shock wave by the piezoelectric element 13.
Figure 7:
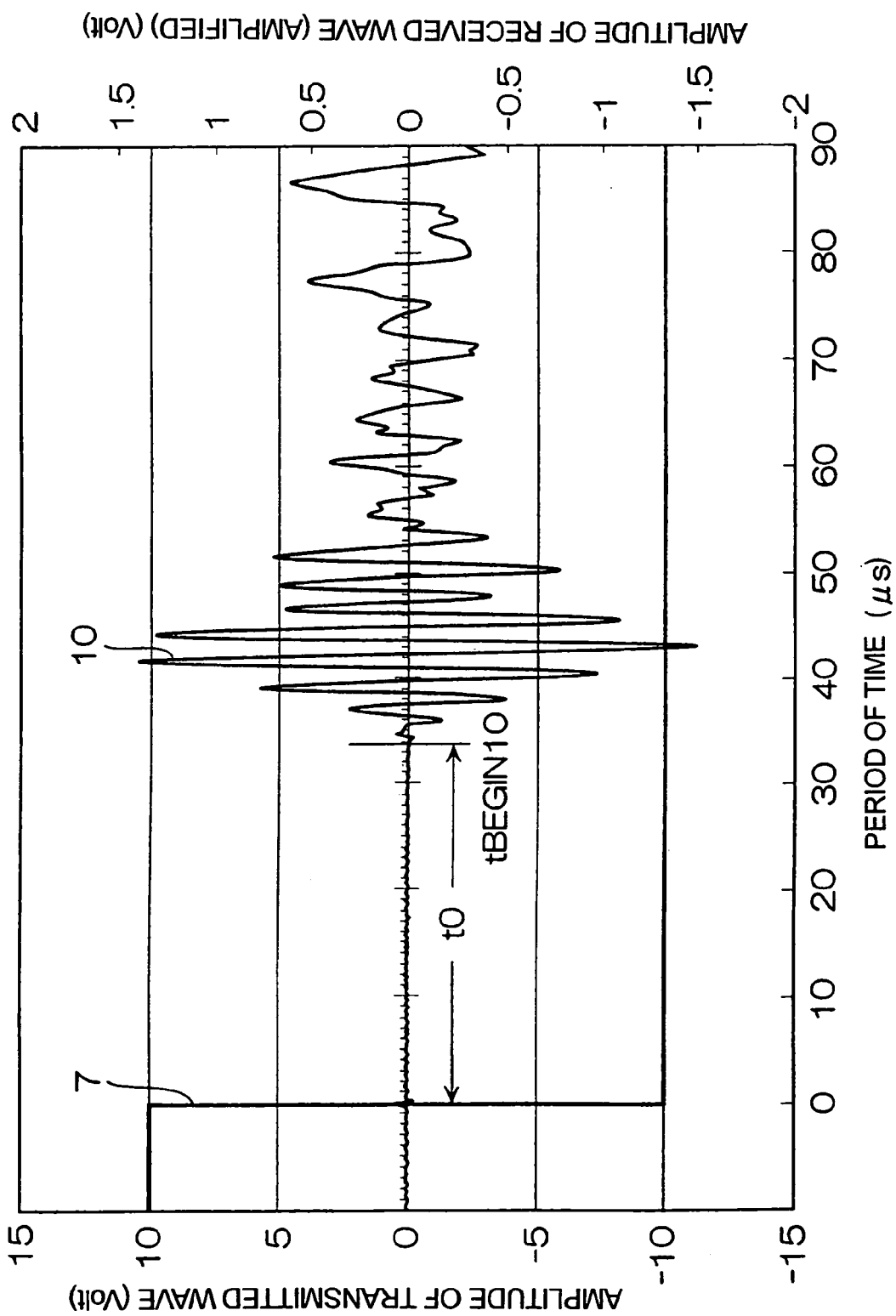
FIG. 7 illustrates a received wave (amplified) which is obtained by the steps of filling water (25° C.) in a tube 11 of the flow rate-measuring apparatus of FIG. 1, applying an impulse wave 7 steeply falling from 10 V to −10 V to the piezoelectric element 13 while the filled water is kept still, transmitting the shock wave generated in the water, and receiving the transmitted shock wave by the piezoelectric element 12.
Figure 8:
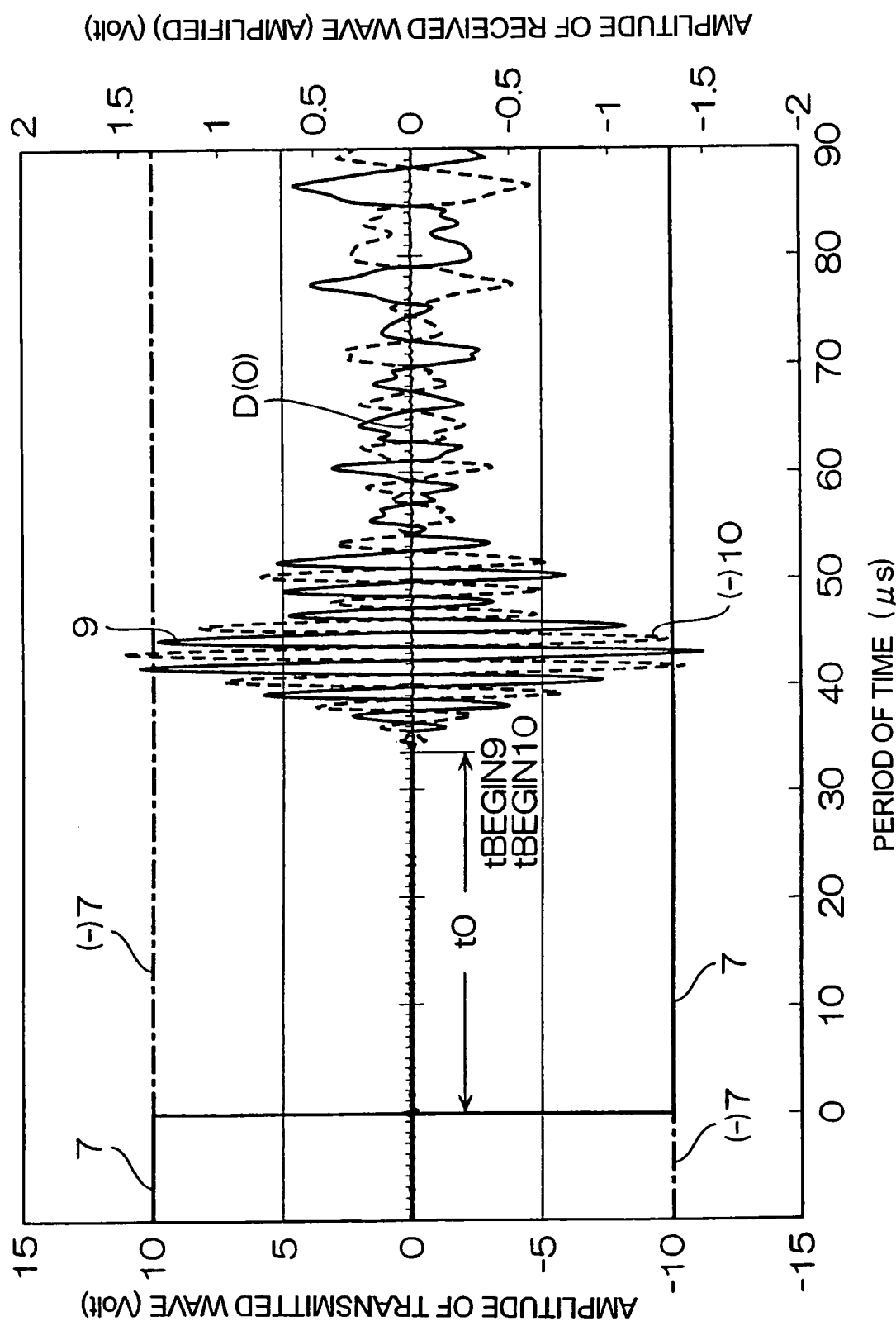
FIG. 8 is a graph prepared by multiplying the received wave 10 (amplified) of FIG. 7 by (−1) to give a received wave (−)10 (amplified) and then placing the received wave (−)10 in FIG. 6 in the form of a broken line, so that the difference of the received wave 9 (amplified) of FIG. 6 and the received wave 10 (amplified) of FIG. 3 can be obtained.
Figure 9:
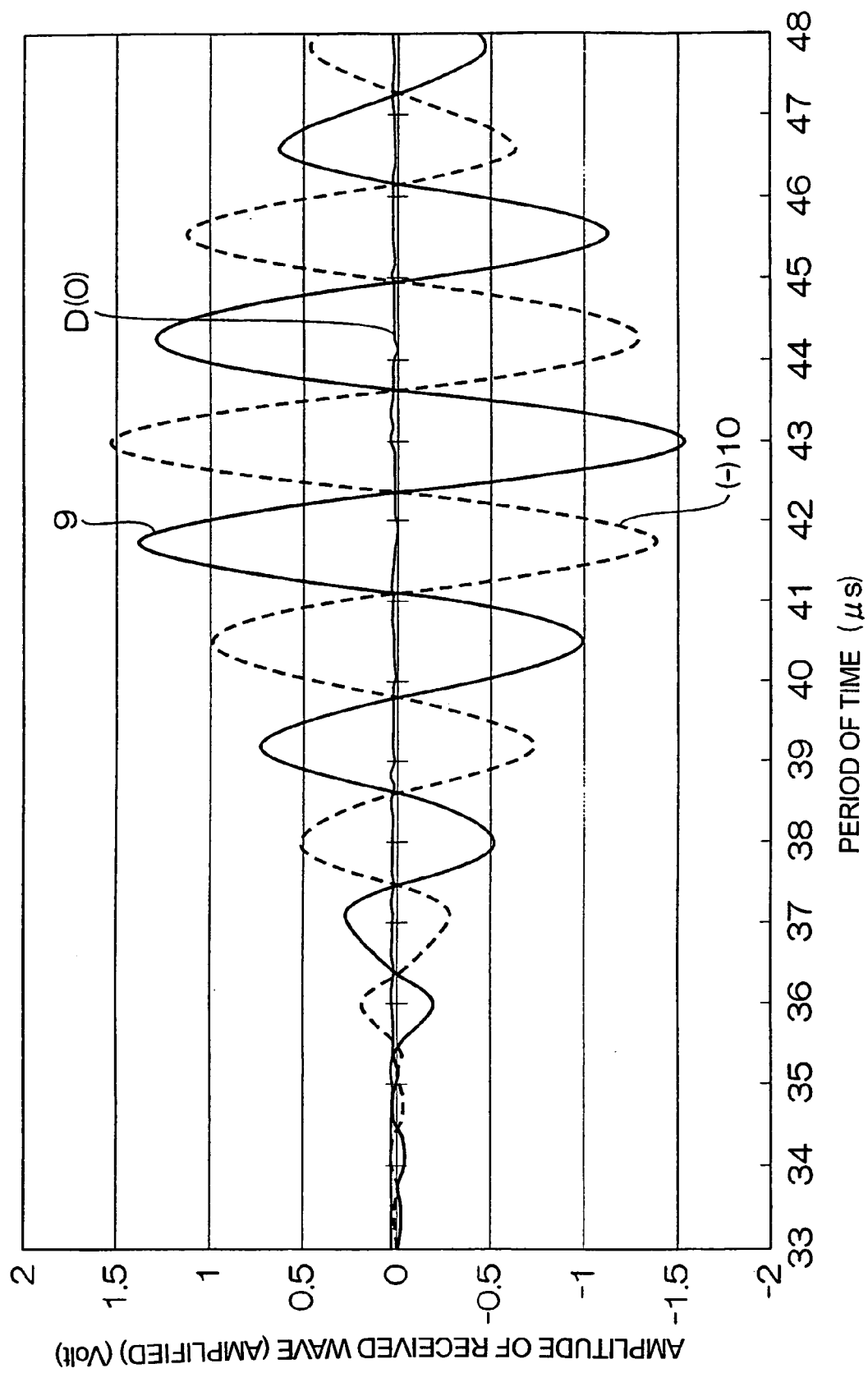
FIG. 9 shows an enlarged view of the received wave from the wave component of the first period to the wave component of the tenth period for each of the received wave 9 (amplified) and the received wave (−)10 (amplified) shown in FIG. 8.
Figure 10:
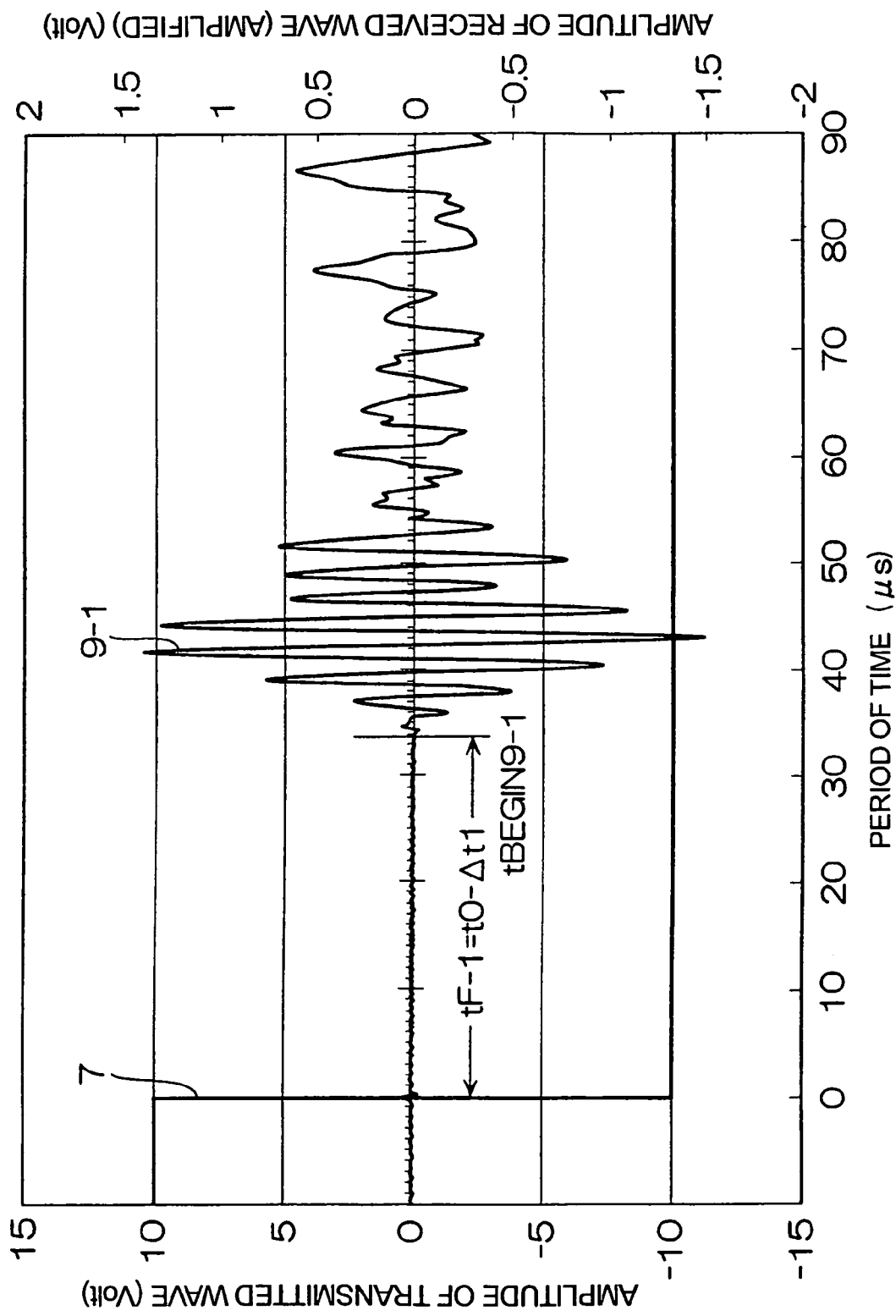
FIG. 10 illustrates a received wave 9-1 (amplified) which is obtained by moving water in a tube 11 from 11A to 11B at a flow rate of 3 m/sec (V=3 m/sec), applying an impulse wave 7 steeply falling from 10 V to −10 V to the piezoelectric element 12, transmitting the shock wave generated in the water, and receiving the transmitted shock wave by the piezoelectric element 13.
Figure 11:
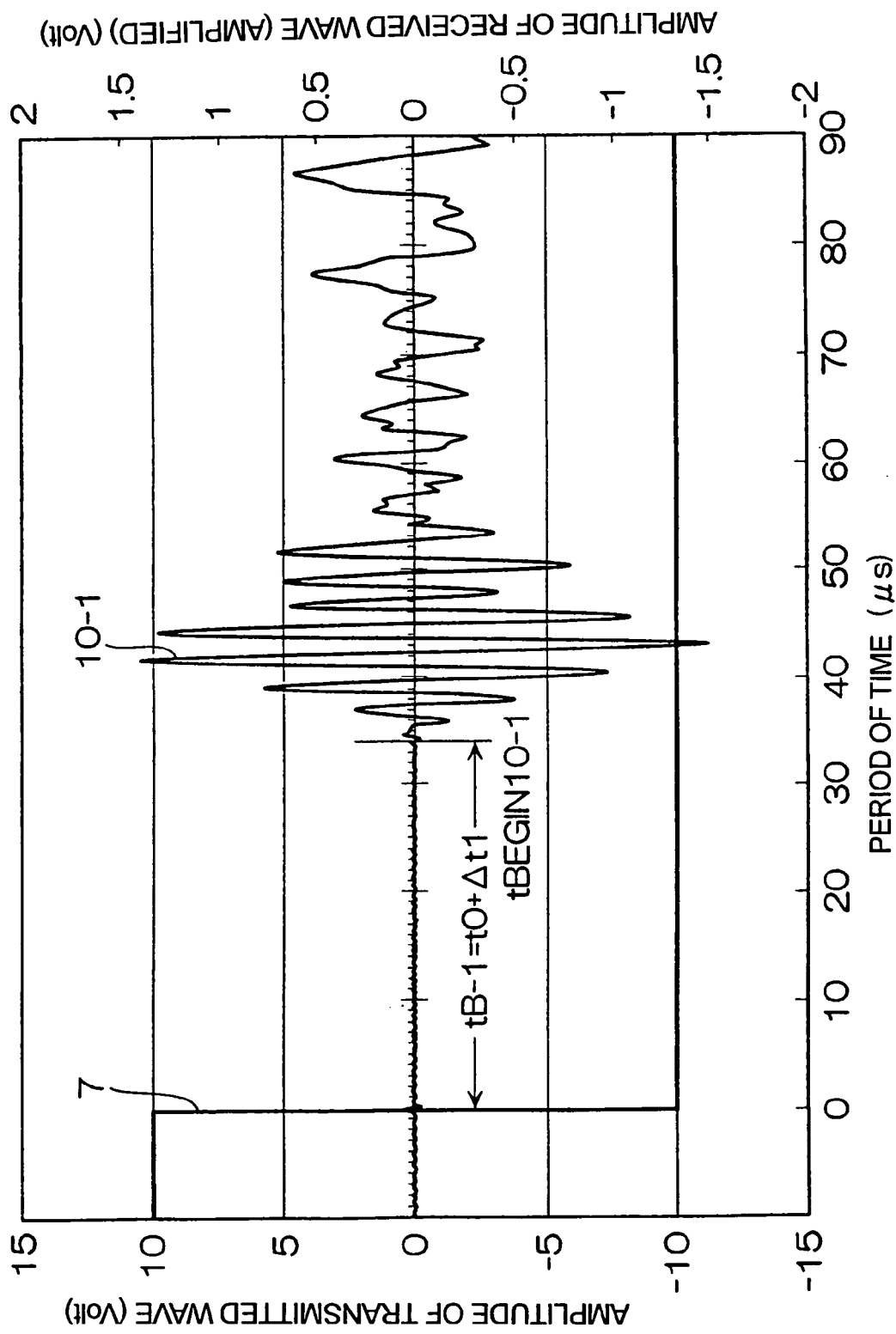
FIG. 11 illustrates a received wave 10-1 (amplified) which is obtained by moving water in a tube 11 from 11A to 11B at a flow rate of 3 m/sec (V=3 m/sec), applying an impulse wave 7 steeply falling from 10 V to −10 V to the piezoelectric element 13, transmitting the shock wave generated in the water, and receiving the transmitted shock wave by the piezoelectric element 12.
Figure 12:
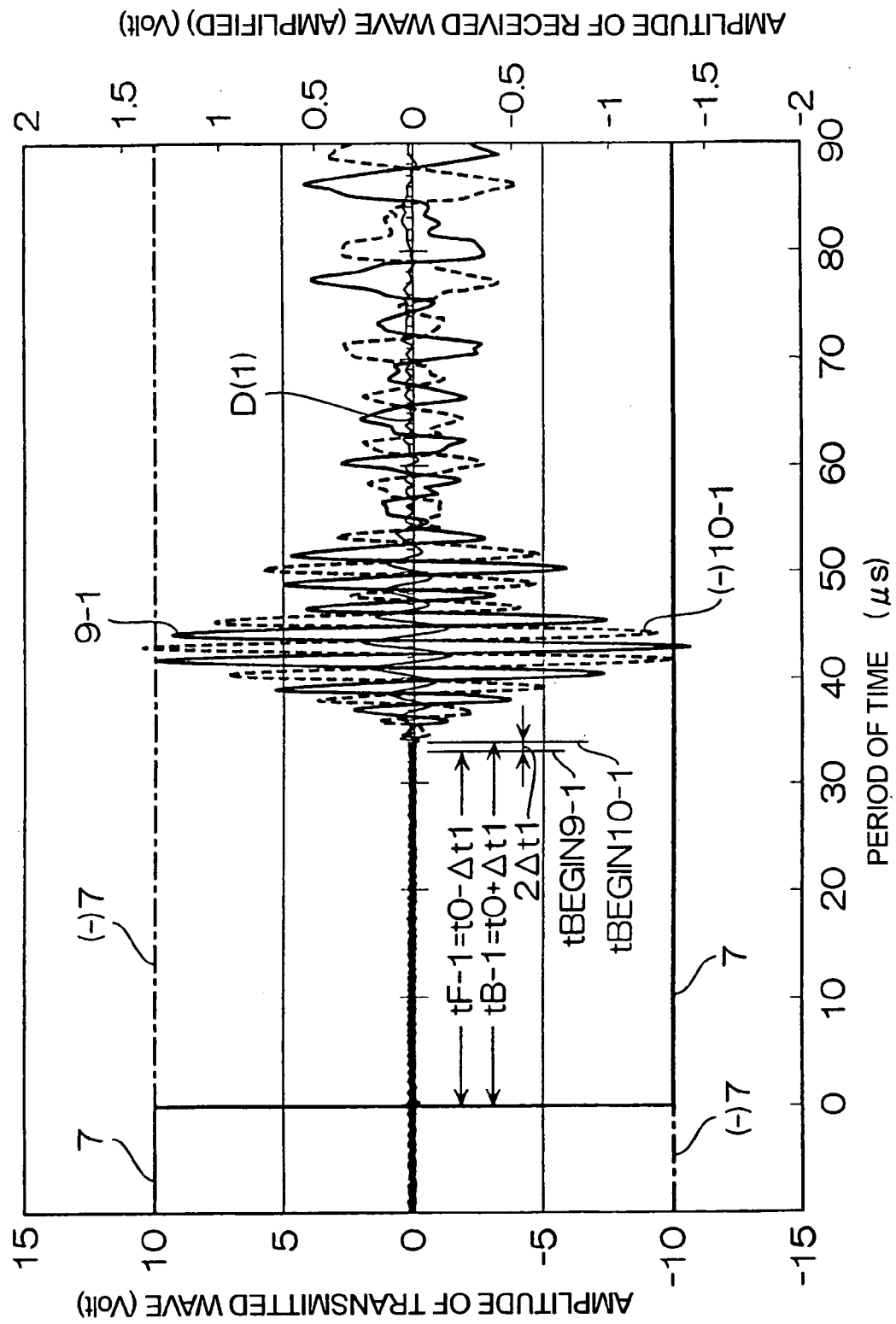
FIG. 12 is a graph prepared by multiplying the received wave 10-1 (amplified) of FIG. 11 by (−1) to give a received wave (−)10-1 (amplified) and then placing the received wave (−)10-1 in FIG. 10 in the form of a broken line, so that the difference of the received wave 9-1 (amplified) of FIG. 10 and the received wave 10-1 (amplified) of FIG. 11 can be obtained.
Figure 13:
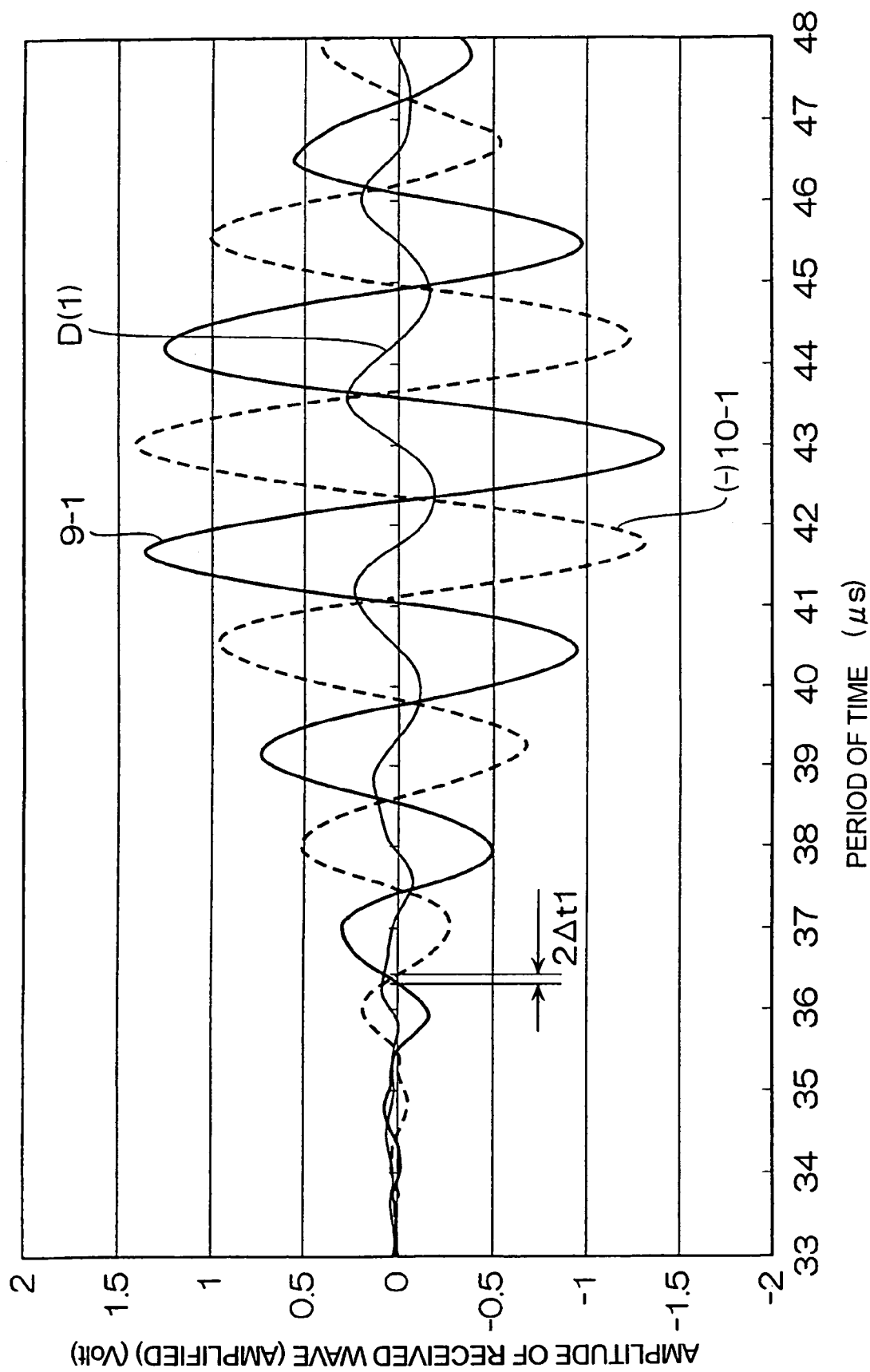
FIG. 13 shows an enlarged view of the received wave from the wave component of the first period to the wave component of the tenth period for each of the received wave 9-1 (amplified) and the received wave (−)10-1 (amplified) shown in FIG. 8.
Figure 14:
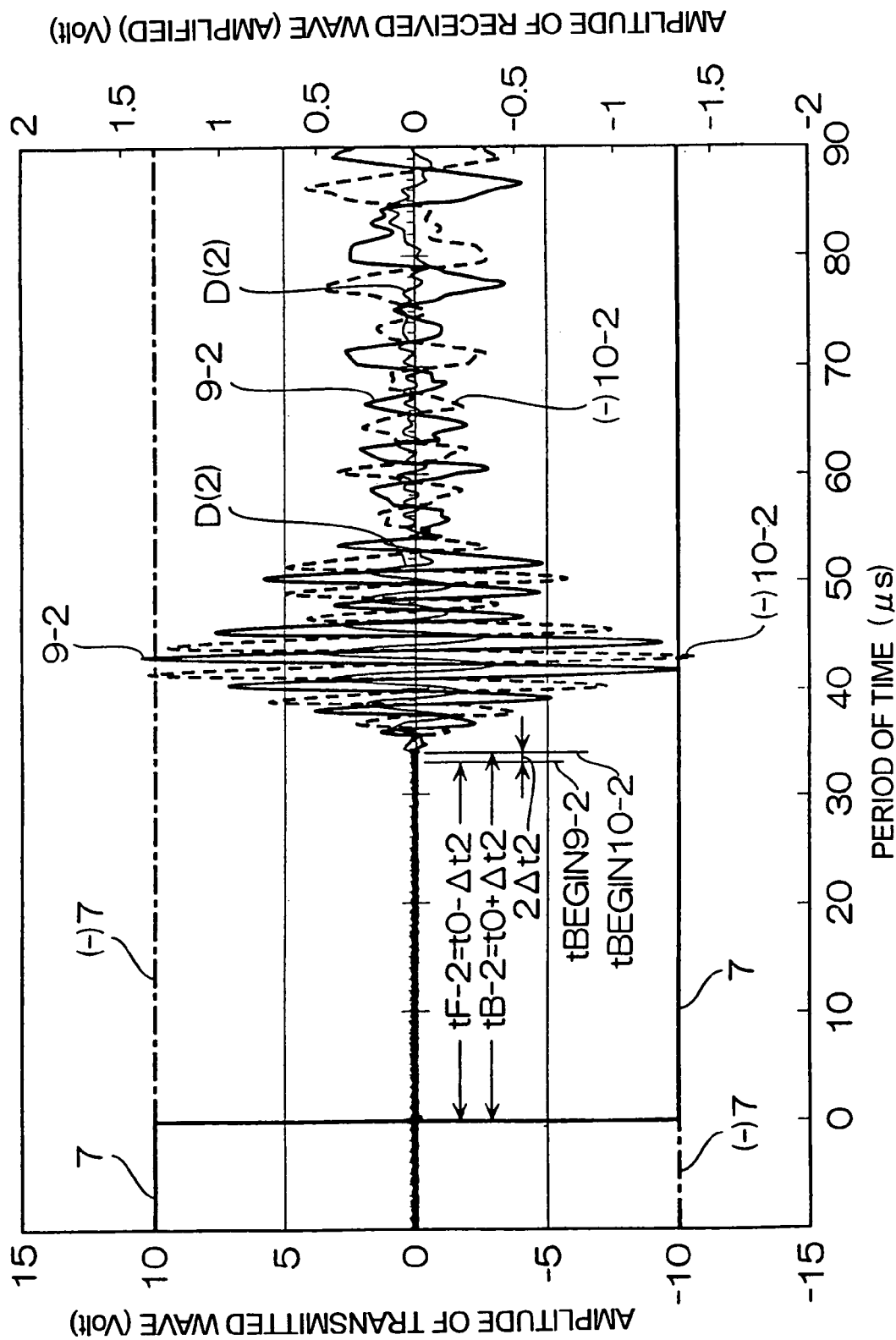
FIG. 14 illustrates a received wave 9-2 (amplified) which is obtained by moving water in a tube 11 from 11A to 11B at a flow rate of 5.7 m/sec (V=5.7 m/sec), applying an impulse wave 7 steeply falling from 10 V to −10 V to the piezoelectric element 12, transmitting the shock wave generated in the water, and receiving the transmitted shock wave by the piezoelectric element 13.
Figure 15:
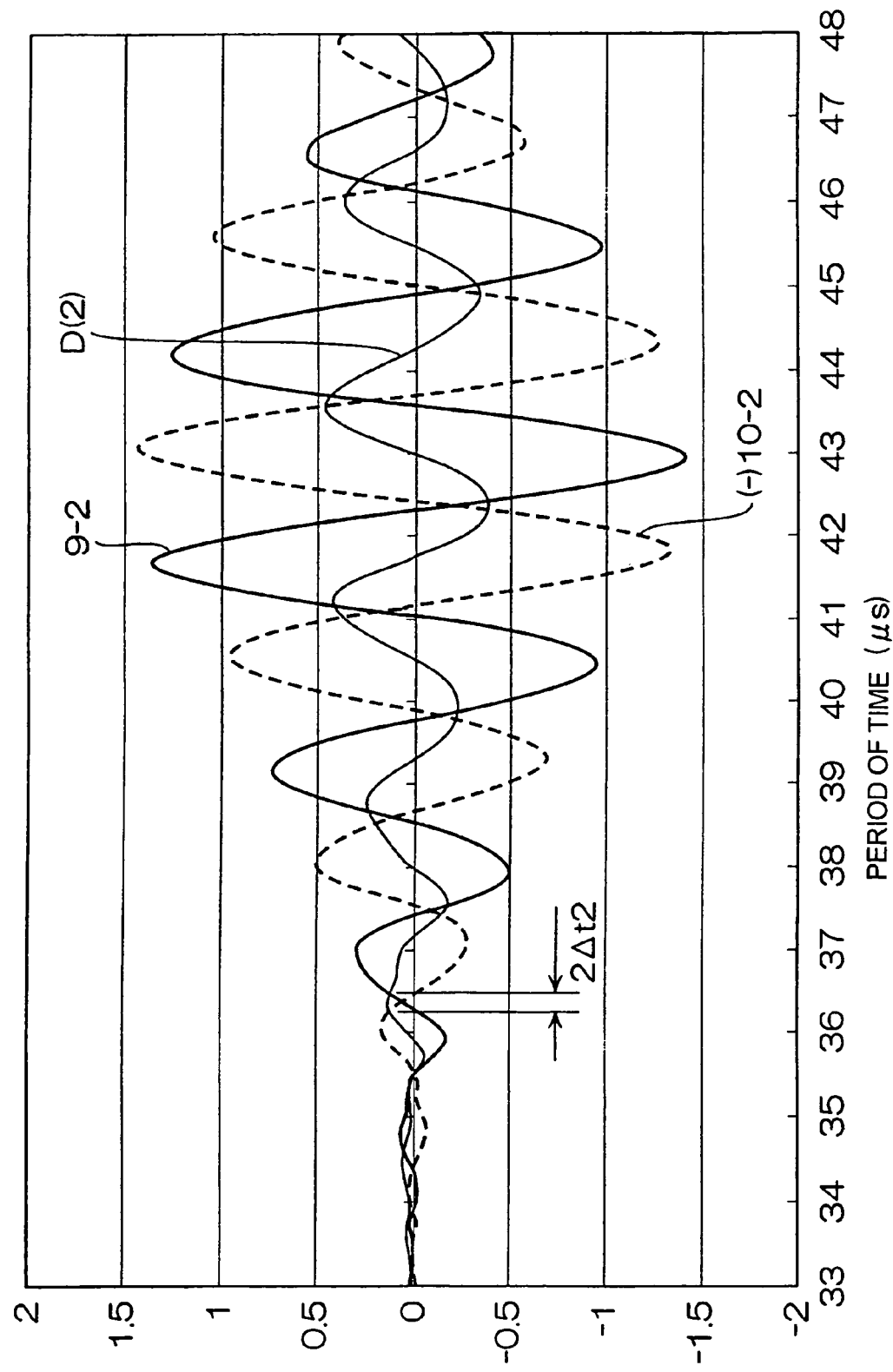
FIG. 15 shows an enlarged view of the received wave from the wave component of the first period to the wave component of the tenth period for each of the received wave 9-2 (amplified) and the received wave (−)10-2 (amplified) shown in FIG. 8.

| | |
|---|---|
| 11 | tube |
| 12 | piezoelectric element |
| 13 | piezoelectric element |
| 20 | piezoelectric element |
| 21 | piezoelectric element |
| 22 | piezoelectric element |
| 23 | piezoelectric element |
| 50 | impulse voltage source |
| 50A | impulse voltage source |
| 50B | impulse voltage source |
| 60 | processor |

What is claimed is:

1. A method for measuring a flow rate of a fluid moving in a tube which comprises the steps of:
    (1) preparing a flowmeter comprising a set of a first upstream side shock wave-generating piezoelectric element and a first downstream side shock wave-receiving piezoelectric element and a set of a second downstream side shock wave-generating piezoelectric element and a second upstream side shock wave-receiving piezoelectric element arranged on a surface of the tube under such condition that the shock wave-generating piezoelectric element and the shock wave-receiving piezoelectric element of each set are arranged along a fluid-moving direction apart from each other at an equivalent distance;
    (2) causing movement of the fluid in the tube and, while the fluid is moving, an impulse voltage with steep rising edge or steep falling edge is applied to the first shock wave-generating piezoelectric element to generate a shock and transmit the shock through a wall of the tube into the moving fluid so as to produce a shock wave in the moving fluid;
    (3) transmitting the shock wave through the moving fluid and receiving the transmitted shock wave by the first shock wave-receiving piezoelectric element through the wall of the tube;
    (4) while the fluid is moving, an impulse voltage with steep rising edge or steep falling edge is applied to the second shock wave-generating piezoelectric element to generate a shock and transmit the shock through the wall of the tube into the moving fluid so as to produce a shock wave in the moving fluid;
    (5) transmitting the shock wave generated in the step (4) through the moving fluid and receiving the transmitted shock wave by the second shock wave-receiving piezoelectric element through the wall of the tube;
    (6) processing data of the wave received in the step (3) and data of the wave received in the step (5) to obtain data of a composite wave and detecting a predetermined characteristic value from the data of the composite wave;
    (7) preparing a relationship between a moving rate of the fluid and the same characteristic value of data of a composite wave corresponding to the moving rate separately; and
    (8) comparing the characteristic value of data of the composite wave obtained in the step (6) with the relationship obtained in the step (7), to calculate the flow rate of the fluid of the step (2).

2. The method of claim 1, wherein the voltage applied by the impulse voltage in the steps (2) and (4) is constant until the generation of the shock in the shock wave-generating piezoelectric element ceases.

3. The method of claim 2, wherein the voltage applied by the impulse voltage in the steps (2) and (4) is kept constant until the shock wave-receiving piezoelectric element receives the shock wave in the steps (3) and (5).

4. The method of claim 1, wherein the processing for obtaining the data of the composite wave in the step (6) is performed by obtaining a difference between the data of the wave received in the step (3) and the data of the wave received in the step (5).

5. The method of claim 1, wherein the characteristic value to be detected in the steps (6) and (7) is a height of a wave appearing in a predetermined position in the composite wave.

6. The method of claim 1, wherein the characteristic value to be detected in the steps (6) and (7) is a height of a highest wave in the composite wave.

7. The method of claim 1, wherein the characteristic value to be detected in the steps (6) and (7) is an integral value of an absolute value of the composite wave.

8. The method of claim 1, wherein the characteristic value to be detected in the steps (6) and (7) is an integral value of absolute values of wave components in a period predetermined within a period from a first wave component to a tenth wave component of the composite wave.

9. The method of claim 1, wherein the characteristic value to be detected in the steps (6) and (7) is an integral value of an absolute value of a highest wave of the composite wave.

10. The method of claim 1, wherein the first upstream side shock wave-generating piezoelectric element serves as the second upstream side shock wave-receiving piezoelectric element and the first downstream side shock wave-receiving piezoelectric element serves as the second downstream side shock wave-generating piezoelectric element.

11. The method of claim 1, wherein the first downstream side shock wave-receiving piezoelectric element serves as the second upstream side shock wave-receiving piezoelectric element.

12. The method of claim 1, wherein the first downstream side shock wave-generating piezoelectric element serves as the second upstream side shock wave-generating piezoelectric element.

13. A method for measuring a flow rate of a fluid moving in a tube which comprises the steps of:
    (1) preparing a flowmeter comprising a set of a first upstream side shock wave-generating piezoelectric element and a first downstream side shock wave-receiving piezoelectric element and a set of a second downstream side shock wave-generating piezoelectric element and a second upstream side shock wave-receiving piezoelectric element arranged on a surface of the tube under such condition that the shock wave-generating piezoelectric element and the shock wave-receiving piezoelectric element of each set are arranged along a fluid-moving direction apart from each other at an equivalent distance;
    (2) causing movement of the fluid in the tube and, while the fluid is moving, an impulse voltage with steep rising edge or steep falling edge is applied to the first shock wave-generating piezoelectric element to generate a shock and transmit the shock through a wall of the tube into the moving fluid so as to produce a shock wave in the moving fluid;

(3) transmitting the shock wave through the moving fluid and receiving the transmitted shock wave by the first shock wave-receiving piezoelectric element through the wall of the tube to measure a period of time required for the transmission of the shock wave from the first shock wave-generating piezoelectric element to the first shock wave-receiving piezoelectric element;

(4) while the fluid is moving, an impulse voltage with steep rising edge or steep falling edge is applied to the second shock wave-generating piezoelectric element to generate a shock and transmit the shock through the wall of the tube into the moving fluid so as to produce a shock wave in the moving fluid;

(5) transmitting the shock wave generated in the step (4) through the moving fluid and receiving the transmitted shock wave by the second shock wave-receiving piezoelectric element through the wall of the tube to measure a period of time required for the transmission of the shock wave from the second shock wave-generating piezoelectric element to the second shock wave-receiving piezoelectric element;

(6) obtaining a difference of the period of time measured in the steps (3) and (5) required for the transmission of the shock wave;

(7) preparing a relationship between a moving rate of the fluid and a difference of period of time required for transmission of shock wave from the shock wave-generating piezoelectric element to the shock wave-receiving piezoelectric element separately;

and (8) comparing the period of time required for the transmission of shock wave obtained in the step (6) with the relationship obtained in the step (7), to calculate the flow rate of the fluid of the step (2).

14. The method of claim 13, wherein the voltage applied by the impulse voltage in the steps (2) and (4) is kept constant until the generation of the shock in the shock wave-generating piezoelectric element ceases.

15. The method of claim 14, wherein the voltage applied by the impulse voltage in the steps (2) and (4) is constant until the shock wave-receiving piezoelectric element receives the shock wave in the steps (3) and (5).

16. The method of claim 13, wherein the first upstream side shock wave-generating piezoelectric element serves as the second upstream side shock wave-receiving piezoelectric element and the first downstream side shock wave-receiving piezoelectric element serves as the second downstream side shock wave-generating piezoelectric element.

17. The method of claim 13, wherein the first downstream side shock wave-receiving piezoelectric element serves as the second upstream side shock wave-receiving piezoelectric element.

18. The method of claim 13, wherein the first downstream side shock wave-generating piezoelectric element serves as the second upstream side shock wave-generating piezoelectric element.

* * * * *